US009956925B2

(12) United States Patent
Akazawa et al.

(10) Patent No.: US 9,956,925 B2
(45) Date of Patent: May 1, 2018

(54) ATTACHING STRUCTURE ASSEMBLY FOR AN ATTACHED COMPONENT

(71) Applicants: Newfrey LLC, New Britain, CT (US); Honda Motor Co., Ltd., Tokyo (JP)

(72) Inventors: Kei Akazawa, Tochigi (JP); Shohei Iwamoto, Saitama (JP); Masakazu Hirai, Saitama (JP)

(73) Assignees: Newfrey LLC, New Britain, CT (US); Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 15/175,470

(22) Filed: Jun. 7, 2016

(65) Prior Publication Data

US 2016/0288733 A1    Oct. 6, 2016

Related U.S. Application Data

(63) Continuation of application No. PCT/JP2014/075618, filed on Sep. 26, 2014.

(30) Foreign Application Priority Data

Dec. 17, 2013  (JP) .................................. 2013-260162

(51) Int. Cl.
*B60R 13/02* (2006.01)
*B60R 13/00* (2006.01)
(Continued)

(52) U.S. Cl.
CPC .......... *B60R 13/00* (2013.01); *B60R 13/0206* (2013.01); *F16B 2/22* (2013.01); *F16B 5/0657* (2013.01); *B29C 33/44* (2013.01); *B29C 45/44* (2013.01); *B29L 2031/7282* (2013.01); *F16B 21/086* (2013.01); *H02G 3/32* (2013.01)

(58) Field of Classification Search
CPC ....... B60R 13/00; B60R 13/0206; F16B 2/22; F16B 5/0657
See application file for complete search history.

(56) References Cited

U.S. PATENT DOCUMENTS 5,051,021 A * 9/1991 Pelz .................... B25G 3/06
                                            248/222.12
5,195,793 A * 3/1993 Maki ...................... F16B 5/128
                                                  24/297
(Continued)

FOREIGN PATENT DOCUMENTS

JP          S6238743 U      3/1987
JP          S6262615 U      4/1988
(Continued)

*Primary Examiner* — Jason W San
(74) *Attorney, Agent, or Firm* — Harness, Dickey & Pierce, PLC

(57) ABSTRACT

A structure is used wherein a clip holding component of a harness protector can be formed as a separate item from a clip. A clip holding component of a type that is moveable in the X axis direction is used for a least one of the clip holding components of the harness protector. This clip holding component that is moveable in the X axis direction has a widened slit to accommodate misalignment in the X axis direction b. The clip holding component may be combined with other stationary type clip holding components or clip holding components which are moveable in the Y axis direction.

13 Claims, 15 Drawing Sheets

(51) Int. Cl.
  *F16B 5/06* (2006.01)
  *F16B 2/22* (2006.01)
  *F16B 21/08* (2006.01)
  *H02G 3/32* (2006.01)
  *B29C 45/44* (2006.01)
  *B29L 31/00* (2006.01)
  *B29C 33/44* (2006.01)

(56) References Cited

U.S. PATENT DOCUMENTS

| | | | | |
|---|---|---|---|---|
| 5,507,610 A * | 4/1996 | Benedetti | ............ | F16B 5/0628 24/297 |
| 5,850,996 A * | 12/1998 | Liang | ............ | A45F 5/02 224/197 |
| 6,394,695 B1 * | 5/2002 | Chausset | ............ | B60R 21/216 248/71 |
| 6,715,185 B2 * | 4/2004 | Angellotti | ............ | F16B 5/065 24/297 |
| 6,910,722 B2 * | 6/2005 | Takeda | ............ | B60R 13/04 293/128 |
| 7,114,221 B2 * | 10/2006 | Gibbons | ............ | F16B 5/065 24/289 |
| 7,165,371 B2 * | 1/2007 | Yoyasu | ............ | B60R 13/04 24/292 |
| 7,178,855 B2 * | 2/2007 | Catron | ............ | B60J 5/0468 24/297 |
| 7,698,787 B2 * | 4/2010 | Scroggie | ............ | F16B 21/082 24/297 |
| 7,954,205 B2 * | 6/2011 | Xueyong | ............ | B60R 13/0206 24/289 |
| 8,291,553 B2 * | 10/2012 | Moberg | ............ | B60J 5/0468 24/297 |
| 8,322,001 B2 * | 12/2012 | Ehrhardt | ............ | B60R 13/0206 24/289 |
| 8,511,631 B2 * | 8/2013 | Kato | ............ | B60R 13/0206 24/297 |
| 8,656,563 B2 * | 2/2014 | Hiramatsu | ............ | F16B 41/002 24/297 |
| 8,671,527 B2 * | 3/2014 | Scroggie | ............ | F16B 5/0642 24/297 |
| 8,671,528 B2 * | 3/2014 | Hayashi | ............ | F16B 5/065 24/297 |
| 8,979,156 B2 * | 3/2015 | Mally | ............ | F16B 5/0657 24/297 |
| 9,216,703 B2 * | 12/2015 | Lauxen | ............ | B60R 13/0206 |
| 9,249,814 B2 * | 2/2016 | Tsai | ............ | A44B 15/00 |
| 9,435,369 B2 * | 9/2016 | Deck | ............ | F16B 39/24 |
| 9,670,947 B2 * | 6/2017 | Bachelder | ............ | B60R 13/0206 |
| 9,739,298 B2 * | 8/2017 | Fellows | ............ | F16B 17/00 |
| 2001/0042273 A1 * | 11/2001 | Chaffee | ............ | A44B 11/2584 5/655.3 |
| 2004/0016088 A1 * | 1/2004 | Angellotti | ............ | F16B 5/065 24/297 |
| 2004/0184896 A1 * | 9/2004 | Tanner | ............ | F16B 41/002 411/119 |
| 2006/0239772 A1 * | 10/2006 | Kuroda | ............ | F16B 5/065 403/329 |
| 2006/0242802 A1 * | 11/2006 | Scroggie | ............ | B60R 13/0206 24/297 |
| 2008/0286067 A1 * | 11/2008 | Swayne | ............ | F16B 21/09 411/182 |
| 2011/0119875 A1 * | 5/2011 | Iwasaki | ............ | B60J 5/0468 24/458 |
| 2012/0074280 A1 * | 3/2012 | Hayashi | ............ | F16B 5/065 248/223.41 |
| 2012/0291240 A1 * | 11/2012 | Suzuki | ............ | B60R 13/0206 24/633 |
| 2013/0229024 A1 * | 9/2013 | Schidan | ............ | B60R 13/0206 296/1.08 |
| 2013/0259595 A1 * | 10/2013 | Hiramatsu | ............ | F16B 41/002 411/107 |
| 2014/0047679 A1 * | 2/2014 | Lepper | ............ | F16B 5/0657 24/453 |
| 2015/0191131 A1 * | 7/2015 | Yamamoto | ............ | F16B 2/20 24/289 |
| 2015/0322985 A1 * | 11/2015 | Scroggie | ............ | F16B 19/008 29/428 |
| 2015/0337882 A1 * | 11/2015 | Iwahara | ............ | F16B 5/0657 24/489 |
| 2016/0290380 A1 * | 10/2016 | Fellows | ............ | F16B 17/00 |
| 2016/0368433 A1 * | 12/2016 | Vega Velazquez | . | B60R 13/0206 |
| 2017/0210305 A1 * | 7/2017 | Shen | ............ | B60R 13/0206 |
| 2017/0268557 A1 * | 9/2017 | Krippl | ............ | B60R 13/0206 |

FOREIGN PATENT DOCUMENTS

| | | |
|---|---|---|
| JP | 2002-181015 A | 6/2002 |
| JP | 2003-343526 A | 3/2003 |
| JP | 2009-204114 A | 9/2009 |

\* cited by examiner

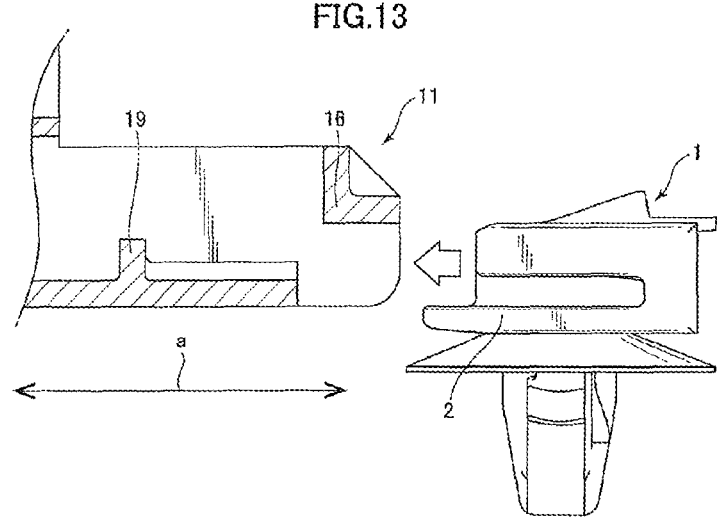
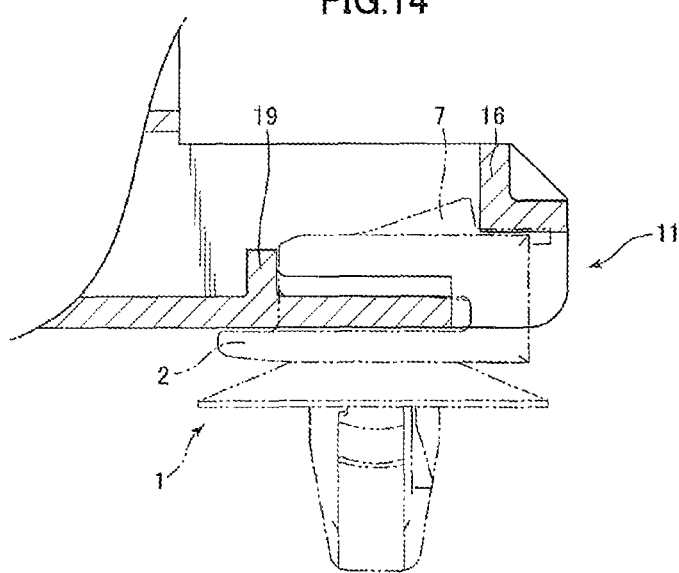

FIG.15
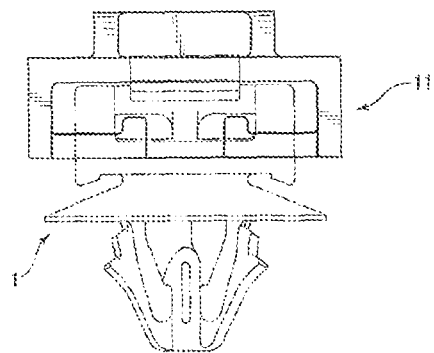
FIG.16
(a)
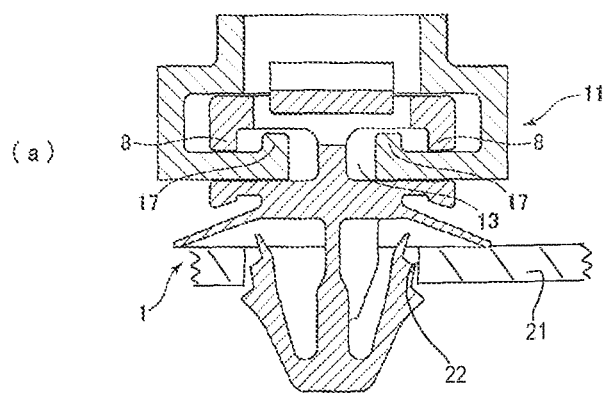
(b)
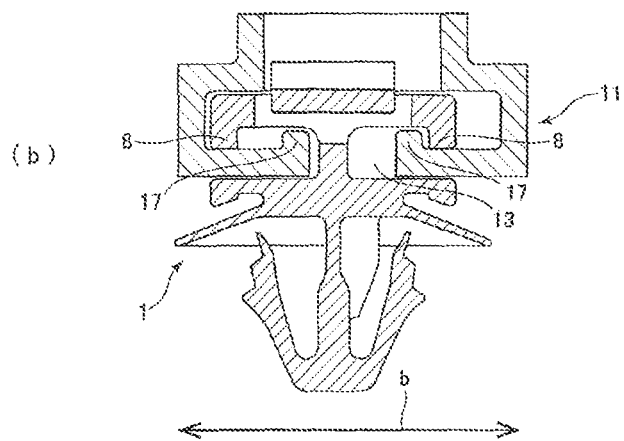

12　17　13　17　12

ATTACHING STRUCTURE ASSEMBLY FOR AN ATTACHED COMPONENT

CROSS-REFERENCE TO RELATED APPLICATIONS

This application is a continuation of PCT Application No. PCT/JP2014/75618, filed Sep. 26, 2014 which claims priority from Japanese Patent Application No. 2013-260162, filed on Dec. 17, 2013, the disclosure of which is incorporated herein by reference in its entirety.

BACKGROUND

The present disclosure pertains to an attaching structure for an attached component and in particular to an attaching structure which attaches an attached component, such as a harness protector or the like, to a panel component of a car body.

As one example of an existing attaching structure, Japanese Patent Publication 2003-343526 discloses a clip attaching structure that attaches an attached component, such as a protector for a harness or the like, to a panel component by means of a clip which has a flexible locking component that locks in a panel component, such as the panel of a car body. In such attaching structure, a clip holding component is provided on the attached component, to which the seat portion of the clip can be attached, and a locking portion is provided on the clip holding component so that the clip is attached to the attached component once said locking component engages with an engaging component provided on the seat portion of the clip.

Japanese Patent Publication 63-62615 also discloses an attaching structure for holding a plastic clip on a clip attaching seat portion for a component made of plastic, such as an upholstery component or the like, when an automotive upholstery component is attached to a body panel. In such attaching structure, the shaft portion of a plastic clip, which has an attaching flange, is attached by sliding into a holding aperture with an insertion hole which is provided on the seat portion of the clip; and in addition to configuring the width of the insertion hole to be essentially the maximum width of the holding aperture, locking tabs are formed integrally on the flange of the shaft portion and engage with the clip attaching seat portion to prevent detachment. The molding of said plastic component uses a mold comprised of an upper mold, a lower mold and a mold with a slide.

Japanese Patent Publication 62-38743 also discloses an attaching structure for attaching an exterior molding made of plastic to an automotive body panel. In such attaching structure, a clip body is used that has a locking leg which engages in and is attached to an engageable insertion aperture of the panel. A horizontal U-shaped notch, which is insertably engaged with the base portion of the clip body, is provided on the attaching seat of the external molding, and a protuberance that abuts the free edge of a stopper tab of the clip body is formed near the open side of said notch.

In the attaching structure of Japanese Patent Publication 2003-343526, the attached component is bent when the clip is attached to the attached component, and the insertion force needed to insert the clip can be controlled only on the clip side. The insertion force is determined by the material used for the attached component, and, as a result, the device cannot offer a stable insertion force. The cost of manufacturing the attaching structure of Japanese Patent Publication 63-62615 is high, inasmuch as a mold with a slide is needed when it is formed with a metal mold. The attaching structure of Japanese Patent Publication 62-38743 has the same horizontal U-shaped notch provided on the seat portion of the external molding as does Japanese Patent Publication 63-62615; and since it may be concluded that it is manufactured by a forming method using a mold with a slide as in Japanese Patent Publication 63-62615, the same high manufacturing costs are a problem as in Japanese Patent Publication 63-62615. In addition to these attaching structures, there are also attaching structures in which the clip and the harness protector or the like are made integrally of plastic. In such kind of attaching structure, a mold with a slide must be used when the clip is formed with a metal mold. In particular, when multiple clip components are formed that attach to a panel component in different directions, the problem exists that a mold with a slide is always needed.

SUMMARY

This section provides a general summary of the disclosure, and is not a comprehensive disclosure of its full scope or all of its features.

One aspect of the present disclosure is an attaching structure assembly that has a stable clip insertion force and a holding strength which are not determined by the material of the attached component, such as a harness protector or the like, and which in addition may be formed without using a mold with a slide, and, moreover, has wide multipurpose uses.

In aspects of the present disclosure, an attaching structure assembly attaches an attached component to a panel component. At least one clip is provided that has an engaging component that engages with the panel component and a mating component that is mated into the attached component. The attached component is manufactured separately by forming it with a metal mold. The attached component has at least one clip holding component that mates with the clip. The mating portion of the clip has a base portion that is connected to the panel engaging component, a columnar portion that is arranged vertically on the base portion, a seat portion that is supported by the columnar portion, a locking component that is provided on the top of the seat portion, flange components that extend from both ends of the seat portion to the bottom, and a mating groove that is provided on the connecting portion of the flanges and the base portion. The clip holding component has a base connecting portion that is inserted into the mating groove of the clip and an engaging component preventing the clip from being detached from the clip holding component by engaging with a locking component, a slit in the base connecting portion that receives the columnar component, and base connecting portion ribs that limit the position of the flange components on the base connecting portion.

In one aspect of the present disclosure, the panel engaging component of the clip is constructed so that it is attached to the panel component by insertion in the Z axis direction relative to the panel component. The mating component of the clip is constructed so that it is attached to an attaching and holding component of the attached component by being inserted in the X axis direction, which is orthogonal to the Z direction, relative to the clip holding component of the attached component.

In another aspect of the present disclosure, the direction of the mold layout of the metal mold used to form the attached component is the Z axis direction.

In a further aspect of the present disclosure, the direction of the mold layout of the metal mold used to form the attached component is the X axis direction.

In a further aspect of the present disclosure, the direction of the mold layout of the metal mold used to form the attached component may be any desired direction from the X axis direction to the Z direction.

In a further aspect of the present disclosure, the clip holding component has a stopper which abuts the seat portion when the clip is inserted and prevents further movement in the insertion direction.

In a further aspect of the present disclosure, the clip holding component has outer ribs which abut the flange components and prevent movement of the clip in the Y axis direction, which is orthogonal to the X axis direction and the Z axis direction of the clip.

In a further aspect of the present disclosure, in addition to a first clip holding component, a second clip holding component is provided. The panel engaging component of the second clip at this second clip holding component is constructed so that it is attached to the panel component by pushing it into the panel component in the X axis direction relative to the panel component. The mating component of the second clip is attached to the attaching and holding component of the attached component by inserting it in the Z axis direction or the Y axis direction relative to the second clip holding component of the attached component.

According to yet further aspects of the present disclosure, the attached component is manufactured separately from the clip with a metal mold. As a result, a stable insertion force and holding force for the clip can be achieved that is not determined by the material of the attached component. Inasmuch as at least one clip holding component of the attached component holds the clip so that the clip can move in a direction perpendicular to the insertion direction and the insertion direction at the surface of the base connecting portion, the multipurpose uses of the attached component are improved, and it is possible to reduce costs with a single attached component. Base connecting portion ribs limit the position of the flange components on the base connecting portion and prevent the clip from being detached from the clip holding component when it moves. Inasmuch as several mating configurations can be offered for the attached component relative to the clip, the attachment of the clip can be done in various directions to the attached component, improving the freedom of design for the attached component. In addition, dimensional errors at the attached component, the clip, and the attaching portion can be accommodated. Further, with the attaching structure assembly of the present disclosure, the attached component can be formed without a mold using a slide.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 13 is a diagram which shows the appearance of the clip holding component of FIG. 9 before it is mated with the clip.

FIG. 14 is a diagram which shows the appearance of the clip holding component of FIG. 9 after it is mated with the clip.

FIG. 15 is a right elevational view of FIG. 14.

FIG. 16 is a diagram explaining the function that accommodates the misalignment of the clip when the clip holding component is in the mated configuration of FIG. 15; in which (a) shows the appearance when the clip is positioned in the center of the clip holding component, and (b) shows the appearance when the clip has slipped from the center of the clip holding component in the Y axis direction.

DETAILED DESCRIPTION

Figure 1:
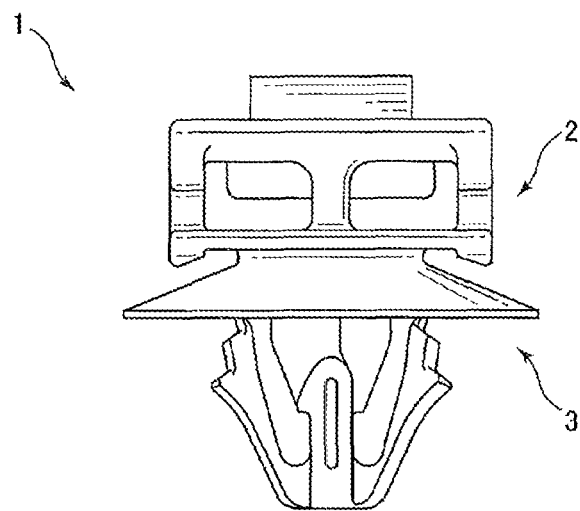
FIG. 1 is a front elevational view of an exemplary clip used with the example embodiments of the attaching structure of the present disclosure.
Figure 2:
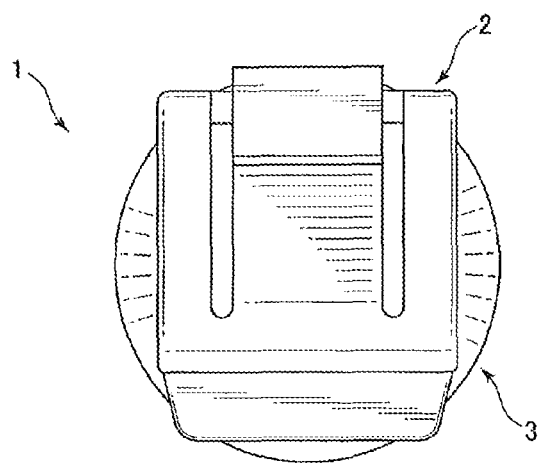
FIG. 2 is a plan view of the clip in FIG. 1.
Figure 3:
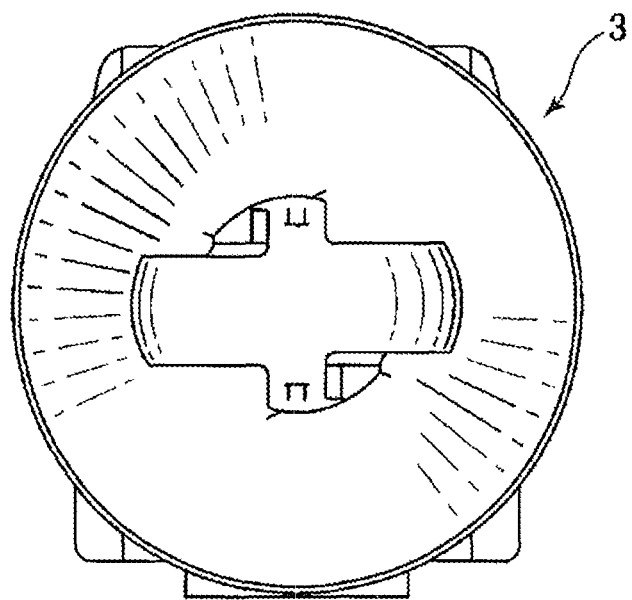
FIG. 3 is a bottom view of the clip in FIG. 1.
Figure 4:
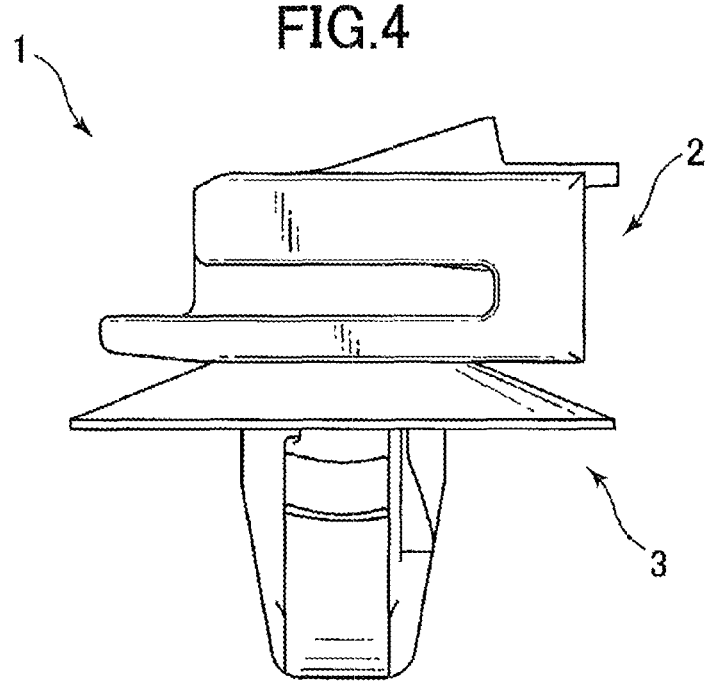
FIG. 4 is a right side elevational view of the clip in FIG. 1.
Figure 5:
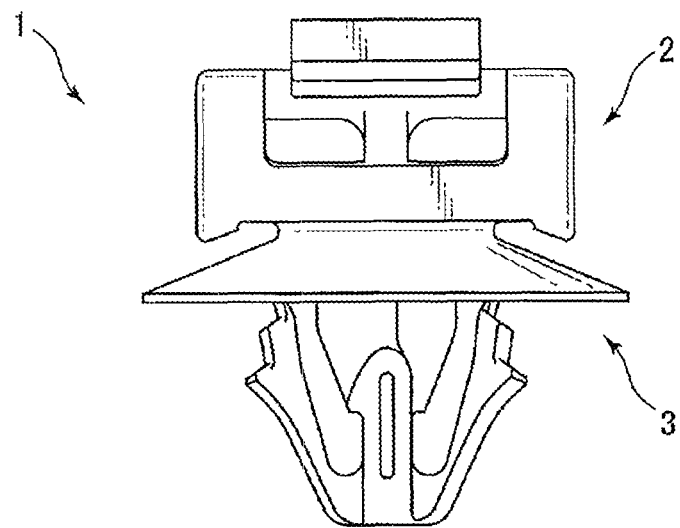
FIG. 5 is a rear view of the clip in FIG. 1.
Figure 6:
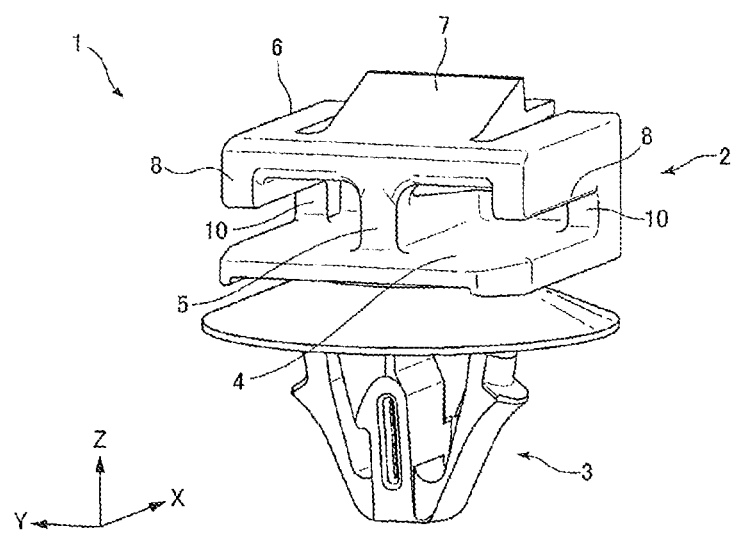
FIG. 6 is a perspective view of the clip in FIG. 1.

Embodiments of the attaching structure of the present disclosure will be explained based on the drawings, as follows. FIGS. 1-6 show one example of a clip 1 which can be used in the attaching structure of the present disclosure. Clip 1 is constructed of a mating component 2 which mates into a harness protector (see FIG. 8) and a panel engaging component 3 which joins to a panel component 21 via an aperture 22 therein (FIG. 16). As depicted in FIG. 6, mating component 2 has a base portion 4 which is connected to the top of panel engaging component 3; a columnar portion 5 which rises perpendicularly from the center of base portion 4; and a seat portion 6 which is supported by columnar portion 5. A locking tab 7 is provided on the top of seat portion 6, and flanges 8 are provided at the bottom surface of both ends of seat 6, which extend downwards on both sides of columnar portion 5. Also, a mating groove 10 is provided at the portion which joins flanges 8 and base portion 4.

Figure 7:
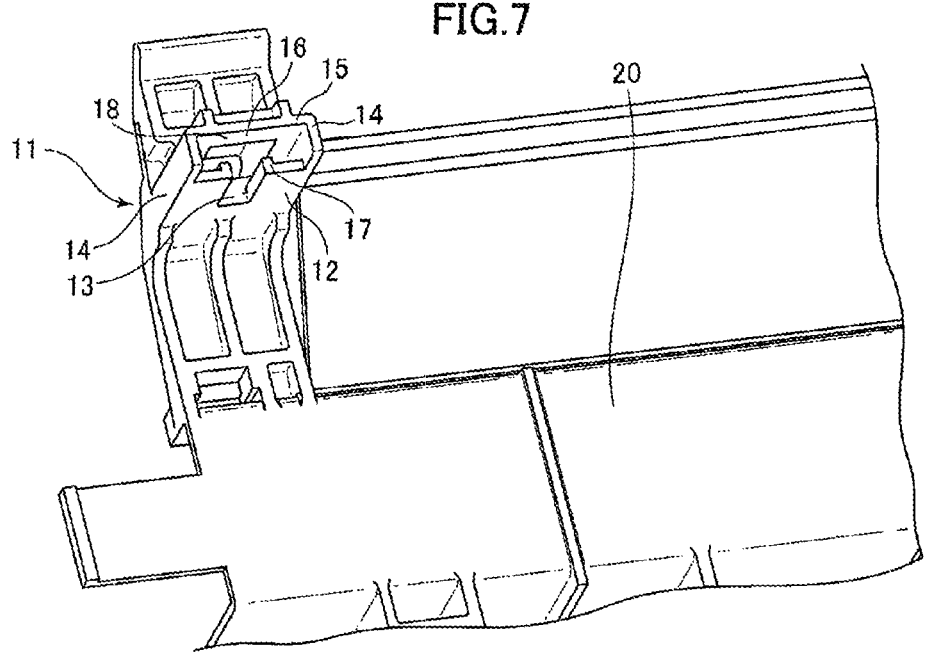
FIG. 7 is a perspective view which shows part of an attached component exemplified as a harness protector that includes a clip holding component.

FIG. 7 shows the clip holding component 11 of the attached component exemplified as harness protector 20 (see FIG. 8) in the attaching structure of the present disclosure. As shown in FIGS. 13 and 14, clip 1 is mated into harness protector 20 (see FIG. 8) by inserting the mating component 2 of clip 1 into the clip holding component 11. The insertion direction is the X axis direction in FIG. 6. Also, the direction for inserting panel engaging component 3 of clip 1 into an aperture 22 of the panel component 21 (FIG. 16) is the Z axis direction in FIG. 6.

As shown in FIG. 7, the exemplary clip holding component 11 has a base connecting portion 12 which forms the bottom surface; a slit 13 which is provided on base connecting portion 12; horizontal walls 14 which rise perpendicularly from both ends of base connecting portion 12; an upper wall 15 which connects both ends of horizontal walls 14; an engaging component 16 which is provided on upper wall 15; and base connecting portion ribs 17 which are provided on the edges of slit 13 of base connecting portion 12. An aperture 18 for inserting clip 1 is formed by base connecting portion 12, slit 13 and upper wall 15.

A stopper 19 is also provided on clip holding component 11 which prevents further movement in the insertion direction by abutting seat portion 6 during insertion. Engaging or cooperating locking component 16 prevents clip 1 from slipping out from clip holding component 11 by engaging with locking tab 7 of clip 1. Also, slit 13 controls movement in the horizontal direction relative to the insertion direction of clip 1 by receiving columnar portion 5. In addition, base connecting portion 12 holds flanges 8 of the inserted clip 1, and base connecting portion ribs 17 control the position of flanges 8 on base connecting portion 12.

Figure 8:
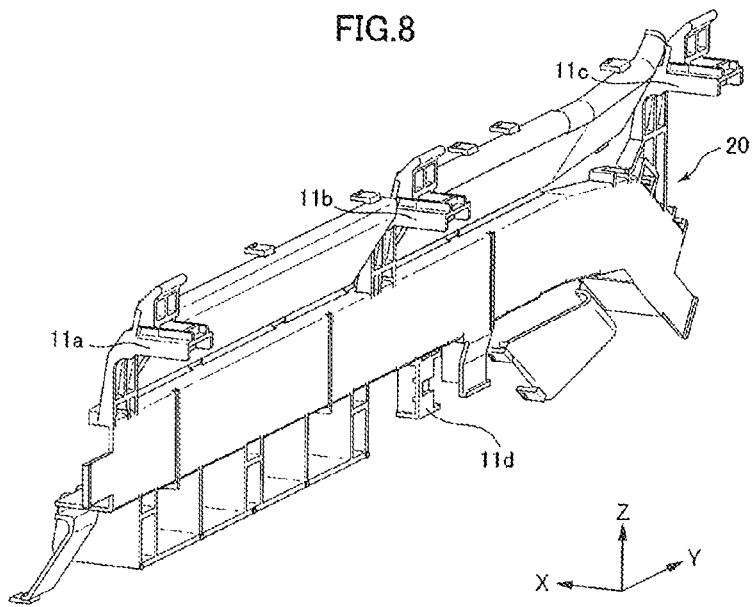
FIG. 8 is a perspective view which shows the entirety of the harness protector in FIG. 7.
Figure 9:
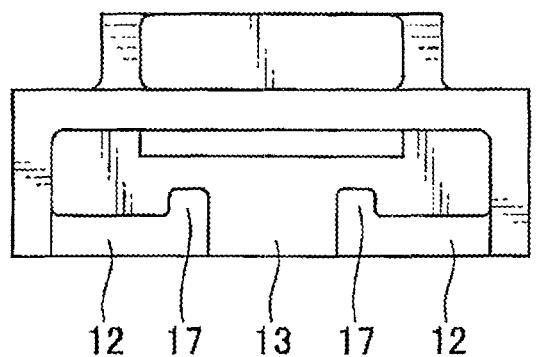
FIG. 9 is a front elevational view which shows the structure of Embodiment 1 of the clip holding component.
Figure 10:
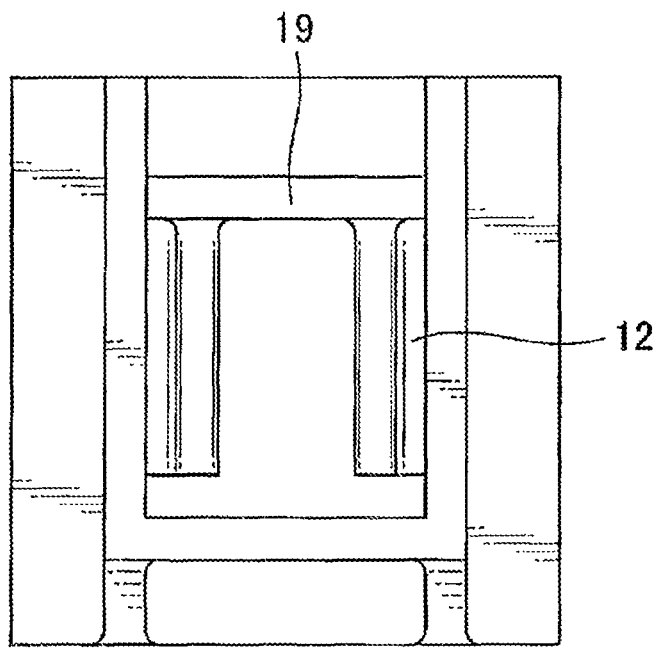
FIG. 10 is a plan view of the clip holding component of FIG. 9.
Figure 11:
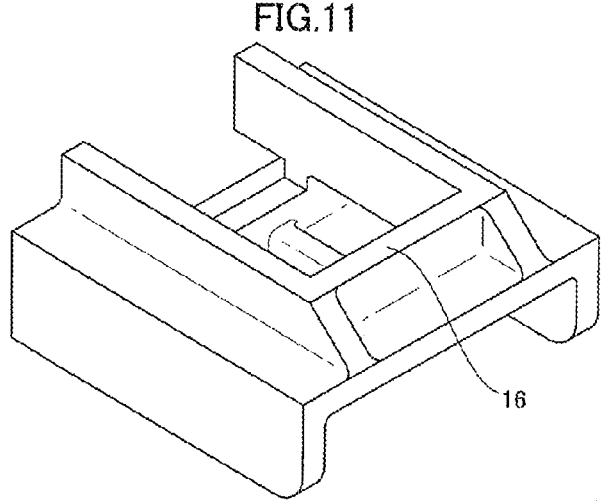
FIG. 11 is a perspective view which shows the entirety of the clip holding component in FIG. 9.
Figure 12:
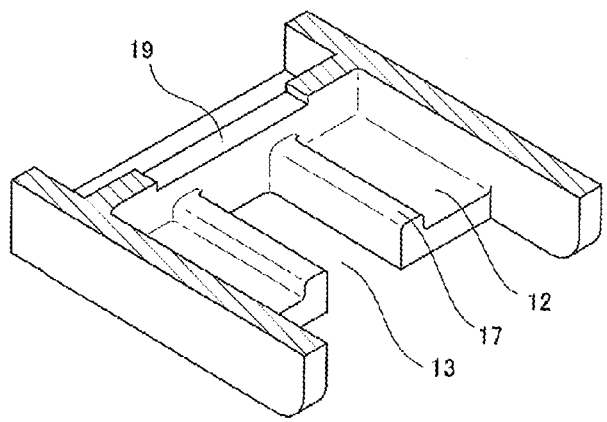
FIG. 12 is a perspective view which shows the lower half of the clip holding component in FIG. 11.

As shown in FIG. 8, harness protector 20 has four clip holding components 11a-11d. In order to improve accommodation of dimensional errors or variations and ease of assembly with the panel, it is possible, in the attaching structure of the present disclosure, to construct one of the four clip holding components 11a-11d, for example clip holding component 11b only, as a stationary holding component which holds clip 1 in a stationary manner, while the remaining holding components 11a, 11c and 11d are constructed as moveable holding components which hold clip 1 in a moveable manner.

Clip holding components 11a-11c are all types that are mated with the clip by inserting clip 1 in the X axis direction; panel engaging component 3 of the mated clip 1 projects in the Z axis direction. Specifically, the clip holding component of Embodiment 1, described below, can be used. In contrast, clip holding component 11d is a type which is mated by insertion in the Y axis direction, and the panel engaging component 3 of the mated clip 1 projects in the X axis direction. Specifically, the clip holding component of Embodiment 4, described below, can be used. By this means, harness protector 20 can be formed by a mold layout in the X direction, and a structure is achieved in which clip holding components 11a-11d can be formed without using a mold with a slide. Also, the direction of movement of the moveable holding components (clip holding components 11a, 11c and 11a) may be either in the insertion direction or in the horizontal direction relative to this direction (for example, the X axis direction or the Y axis direction for clip holding components 11a and 11c; and the Y axis direction or the Z axis direction for clip holding component 11d) and by means of combining the direction of the mold layout of the metal mold used in the forming with the directions in which movement is possible, there are five structures for the moveable holding components. These structures will be explained as Embodiments 1-5, below. Also, the mold layout direction need not be only the X axis direction or the Y axis direction, but may be any desired angle between the X axis direction and the Y axis direction. This is explained as Embodiment 6.

FIGS. 9-16 show a clip holding component according to Embodiment 1. This clip holding component is formed with a mold layout direction in the X axis direction (that is, the clip insertion direction) and, as a result, clip 1 has a structure which allows it to move in the Y axis direction (that is, in a horizontal direction relative to the insertion direction of clip 1). As shown by the double arrow "a" in FIG. 13, it can be formed only by a two-plate mold which has a mold layout in the X axis direction. As stated above, the clip holding component of Embodiment 1 has a base connecting portion 12, a slit 13, an engaging component 16, base connecting portion ribs 17, a stopper 19, and the like. Clip 1 is inserted in this clip holding component in the X axis direction (from right to left in FIG. 13), and the mating component 2 of clip 1 abuts stopper 19; the locking tab 7 of clip 1 engages with the engaging component of this clip holding component and is held in the clip holding component. Furthermore, this clip holding component, when compared with the stationary clip holding component type of Embodiment 3 which will be explained later, has a slit 13 with a wide horizontal width (that is, the width in the Y axis direction). In this way, it is possible to accommodate a misalignment of clip 1 in the Y axis direction, as shown by the double arrow b in FIG. 16. Also, in contrast to the stationary clip holding component type of Embodiment 3 which will be explained later, this clip holding component has base connecting portion ribs 17 only on the edges of slit 13, and outer side ribs 17a are not provided on its outer side. This is done to make flanges 8 of clip 1 move in a smooth fashion on base connecting portion 12 in the Y axis direction. Also, base portion 4 and flanges 8 of clip 1 work synergistically to clamp and hold base connecting portion 12, controlling motion in the Y axis direction and stabilizing the position of clip 1.

Figure 17:
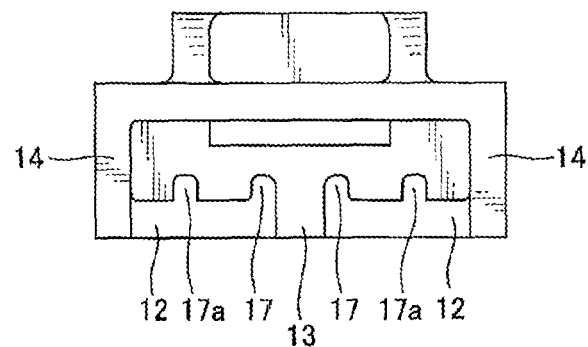
FIG. 17 is a front elevational view which shows the structure of Embodiment 2 of the clip holding component.
Figure 18:
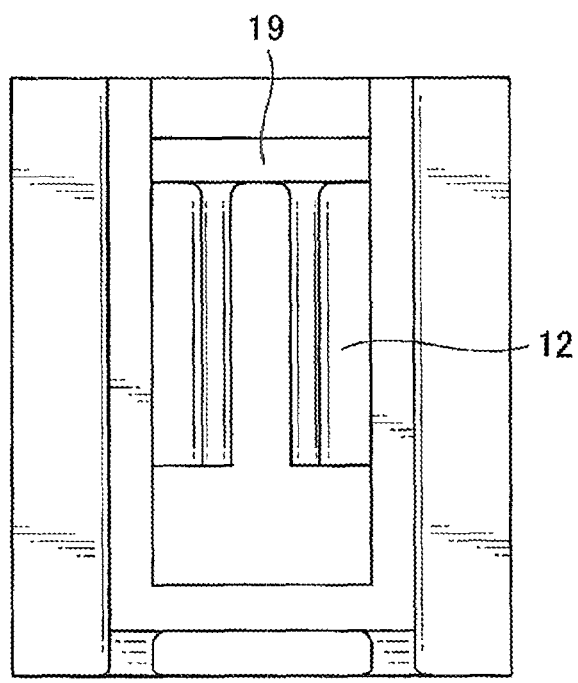
FIG. 18 is a plan view of the clip holding component of FIG. 17.
Figure 19:
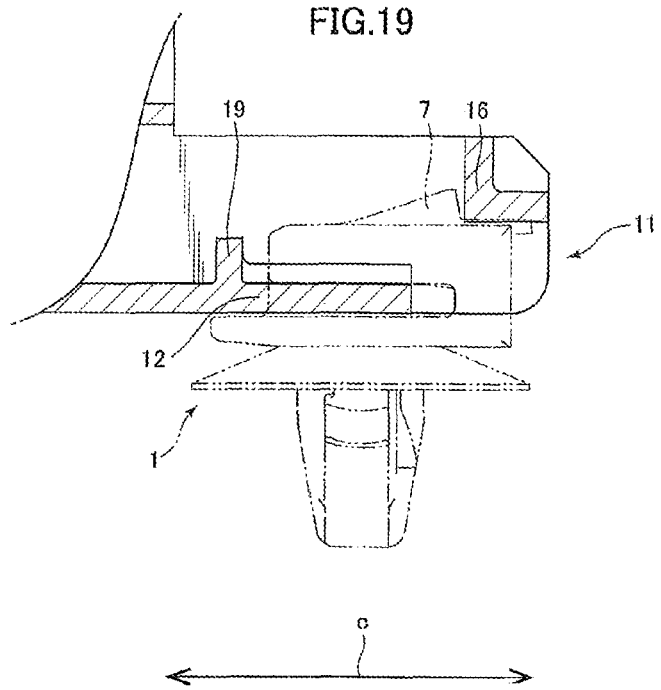
FIG. 19 is a diagram similar to FIG. 14, which shows the appearance of the clip holding component of FIG. 17 after it has been mated with the clip.
Figure 20:
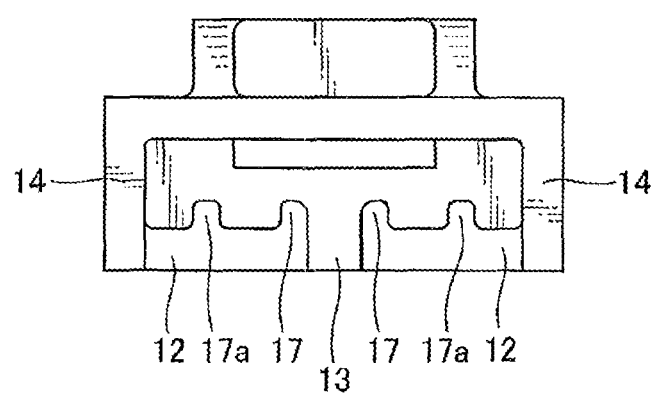
FIG. 20 is a front elevational view which shows the structure of Embodiment 3 of the clip holding component.
Figure 21:
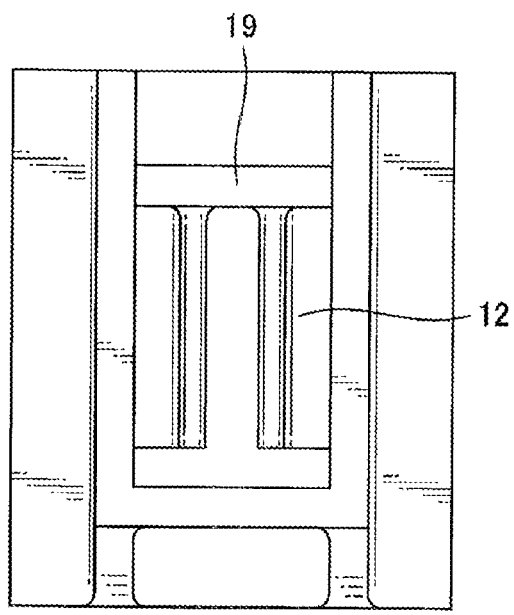
FIG. 21 is a plan view of the clip holding component of FIG. 20.
Figure 22:
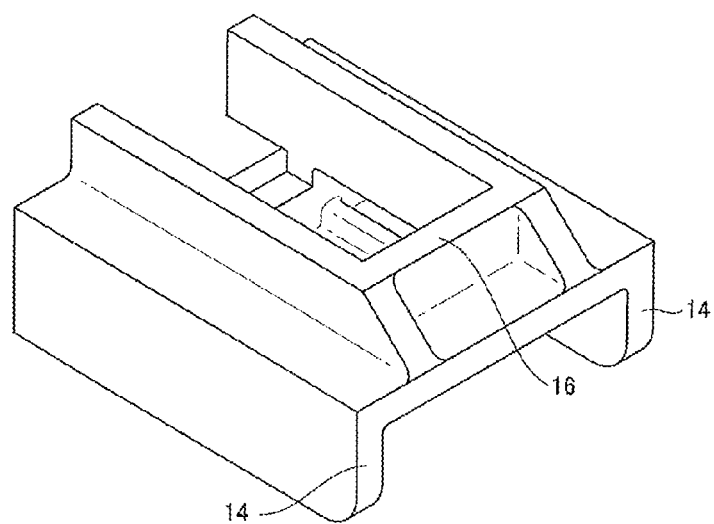
FIG. 22 is a perspective view which shows the entirety of the clip holding component of FIG. 20.
Figure 23:
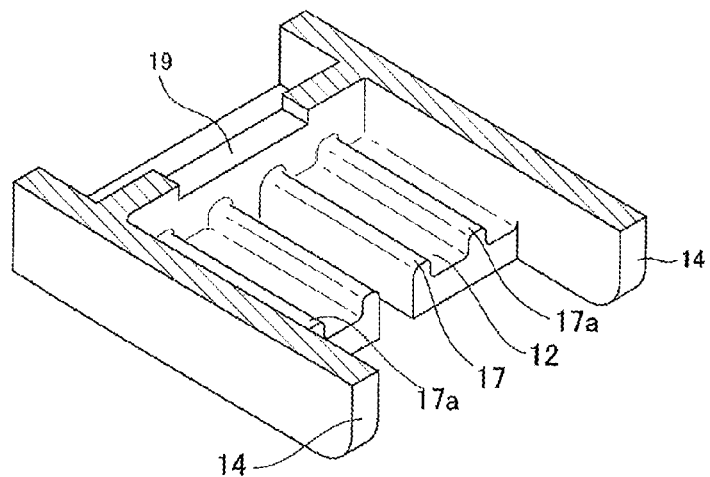
FIG. 23 is a perspective view which shows the lower half of the clip holding component of FIG. 22.
Figure 24:
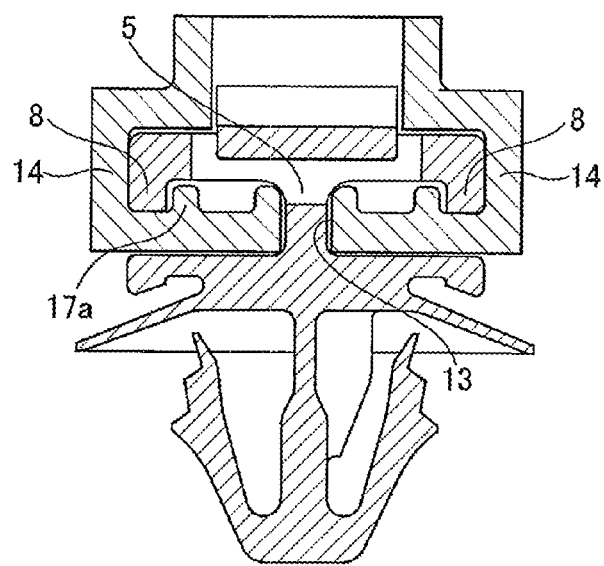
FIG. 24 is a diagram which shows the appearance of the clip holding component of FIG. 20 after it has been mated with the clip.
Figure 25:
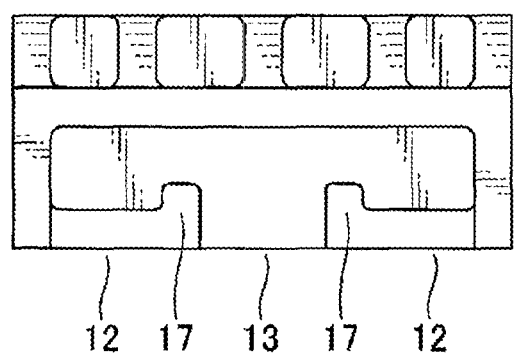
FIG. 25 is a front elevational view which shows the structure of the clip holding component of Embodiment 4.
Figure 26:
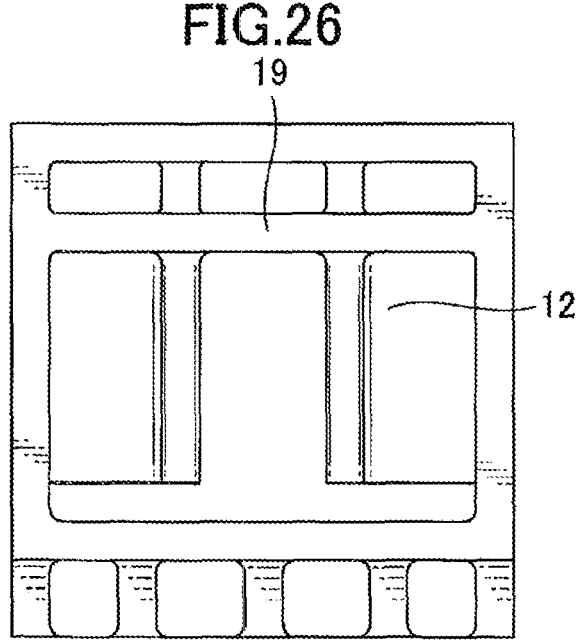
FIG. 26 is a plan view of the clip holding component of FIG. 25.
Figure 27:
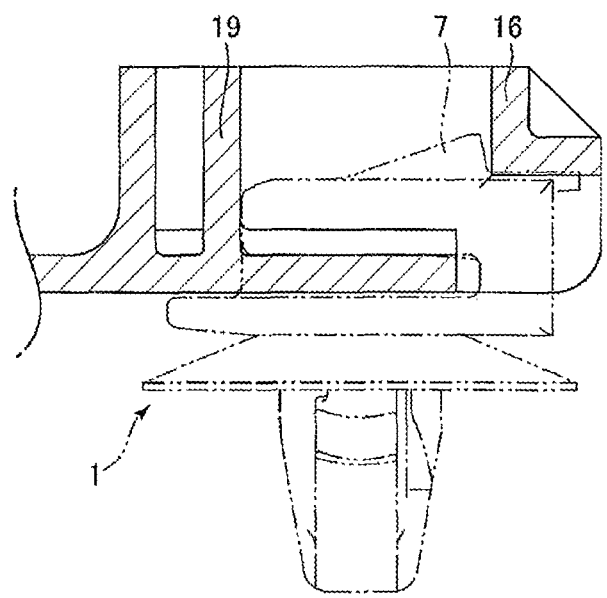
FIG. 27 is diagram similar to FIG. 14, which shows the appearance of the clip holding component of FIG. 25 after it has been mated with the clip.
Figure 28:
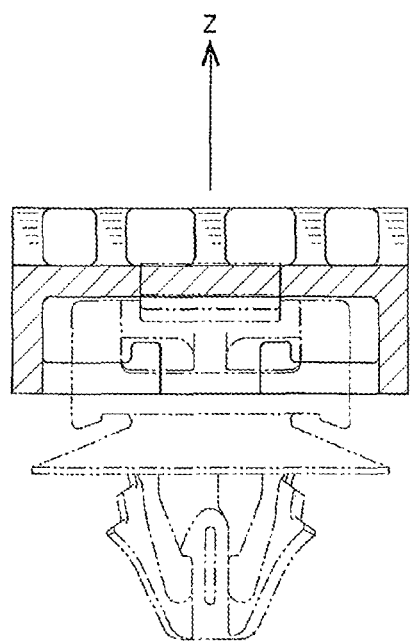
FIG. 28 is a right elevational view of FIG. 27.

FIGS. 17-19 show a clip holding component according to Embodiment 2. This clip holding component is formed with a mold layout in the X axis direction (that is, the insertion direction of clip 1) and has a structure which allows clip 1 to move in the X axis direction (that is, the insertion direction of clip 1). This clip holding component has a base connecting portion 12; a slit 13; base connecting portion ribs 17a; outer side ribs 17a; a stopper 19, and the like. In this clip holding component, base connecting portion 12 and stopper 19, as compared to the stationary holding component type of Embodiment 3 which will be explained later, are placed in staggered fashion towards the left in FIG. 19 (towards the top in FIG. 18) and permit movement of clip 1 in the X axis direction. In this way, it becomes possible to accommodate a misalignment of clip 1 in the X axis direction as shown by the double arrow c in FIG. 19.

The remainder of the structure is the same as that of the stationary holding component type of Embodiment 3, which will be discussed below.

FIGS. 20-24 show a clip holding component according to Embodiment 3. This clip holding component is formed with a mold layout in the X axis direction (that is, the insertion direction of clip 1) and has a structure in which clip 1 is held in a stationary fashion. This clip holding component has a base connecting portion 12; a slit 13; an engaging component 16; base connecting portion ribs 17; outer side ribs 17a; a stopper 19, and the like; and in order to control movement in the X axis direction of clip 1 (that is, the insertion direction of clip 1) and in the Y axis direction (that is, in the horizontal direction relative to the insertion direction), the position of stopper 19, the position of outer side ribs 17a, the gap between side walls 14 of the clip holding component and the width of slit 13 are adjusted. That is, in order to control movement in the Y axis direction, the horizontal width of slit 13 is made the same as the horizontal width of columnar portion 5 of clip 1, and the gap between the two outer side ribs 17a is made the same as the gap between the inner side surfaces of flanges 8 of clip 1, and the gap between the inner side surfaces of horizontal walls 14 of the clip holding component is made the same as the gap between the inner side surfaces of flanges 8 of clip 1. In addition, in order to control movement in the Y axis direction, the position of stopper 19 is made to be such that it abuts the tip of clip 1 when locking tab 7 of clip 1 engages with engaging component 16 of the clip holding component.

FIGS. 25-28 show a clip holding component according to Embodiment 4. This clip holding component is formed with a mold layout in the Z axis direction (that is, the direction in which clip 1 is pushed into the panel component) and has a structure in which clip 1 is moveable in the Y axis direction (that is, the horizontal direction relative to the insertion direction of clip 1). This clip holding component is unlike the clip holding component of Embodiment 1 in that part of its structure is different from the structure of Embodiment 1 so that it can be ejected from the mold in the Z axis direction. However, the structure is the same as in Embodiment 1 in that the horizontal width of slit 13 is wide; base connecting portion ribs 17 are placed only on the edges of slit 13; and outer side ribs 17a are not provided. Also, although the structure of the clip holding component is such that clip 1 becomes moveable in the Y axis direction (that is, in a horizontal direction relative to the insertion direction of clip 1) it may be used as a clip holding component with a structure in which clip 1 is moveable in the Y axis direction (that is to say, in the horizontal direction relative to the insertion direction of clip 1) by having it face the clip insertion hole in the Y axis direction. That is to say, the clip holding component according to Embodiment 4 is movable in either the X axis direction or the Y axis direction, and in any direction between the X axis direction and the Y axis direction.

Figure 29:
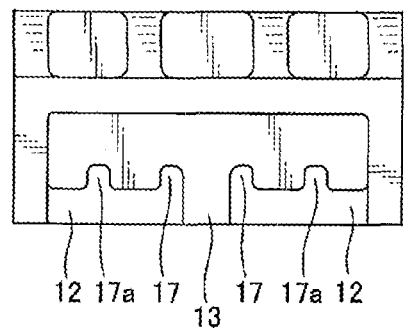
FIG. 29 is a front elevational view which shows the structure of the clip holding component of Embodiment 5.
Figure 30:
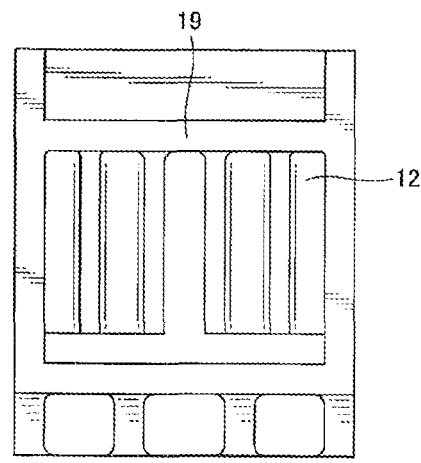
FIG. 30 is a plan view of the clip holding component in FIG. 29.
Figure 31:
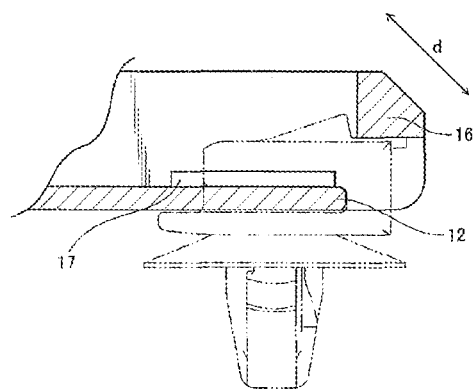
FIG. 31 is a diagram similar to FIG. 14, which shows the structure of the clip holding component of Embodiment 6.

FIGS. 29-30 show a clip holding component according to Embodiment 5. This clip holding component is formed with a mold layout in the Z axis direction (that is, the direction in which clip 1 is pushed into the panel component) and has a structure in which clip 1 is held in a stationary fashion. This clip holding component has the same structure as that of Embodiment 4 so that it can be ejected from the mold in the Z axis direction, but because it is a stationary holding component type, it is different from Embodiment 4 in that the horizontal width of slit 13 is narrow, and in that it has outer side ribs 17a. This clip holding component is a stationary holding component type, and as a result, it has a structure for controlling the movement of clip 1 in the X axis direction and in the Y axis direction, as does the structure of Embodiment 3.

FIG. 30 shows a clip holding component according to Embodiment 6. This clip holding component is formed with a mold layout direction in any desired angle from the X axis direction to the Y axis direction (that is, in any desired angle from the insertion direction of clip 1 to the direction in which clip 1 is pushed into the panel component) and has a structure in which clip 1 is held in a stationary manner. This clip holding component has the same structure as in Embodiment 4 so that the clip holding component can be ejected from the mold in any desired angle between the X axis direction and the Z axis direction, and in place of a stopper 19, the mating groove 10 of clip 1 abuts base connecting portion 12 of this clip holding component, controlling movement of clip 1 in the X axis direction. This clip holding component as well can allow or control movement of clip 1 in the X axis direction or the Y axis direction by means of having the structure of Embodiments 1-3.

Although in the foregoing we have described the attached structure of the present disclosure by means of embodiments which use a harness protector as the attached structure, large plastic parts such as interior trim and automotive covers may also be used as the attached structures.

It will be appreciated by persons skilled in the art that the above embodiments have been described by way of example only, and not in any limitative sense, and that various alterations and modifications are possible without departure from the scope of the invention as defined by the appended claims.

What is claimed is:

1. An attaching structure assembly for attaching an attached component to a panel component, the attaching structure assembly comprising:
   a clip including a panel engaging component structured to couple the clip to an aperture of the panel component, and a mating component structured to couple the clip to a clip holding component of the attached component; and
   wherein the mating component of the clip has a base portion that is connected to the panel engaging component, a columnar portion that is erected perpendicularly to the base portion, a seat portion that is supported by the columnar portion, a locking tab that is provided on the top of the seat portion, flanges that extend downward from both ends of the seat portion, and a mating groove between the base portion and the flanges; and
   wherein the clip holding component of the attached component has a base connecting portion inserted into the mating groove of the clip, an engaging component engaged with the locking tab to retain the clip in the clip holding component, a slit in the base connecting portion which receives the columnar portion, and base connecting portion ribs positioned to engage the flanges and limit movement of the clip;
   wherein the clip and the attached component are separate components, each separately formed of a molded thermoplastic material.

2. The attaching structure assembly of claim 1, wherein the panel engaging component is structured to move in a Z axis direction as the panel engaging component is inserted into the aperture of the panel component, and wherein the mating component of the clip and the holding component of the attached component are structured for relative movement in a X axis direction, which is orthogonal to the Z axis direction, as the clip is inserted into the clip holding component.

3. The attaching structure assembly of claim 2, wherein the attached component, including the clip holding component, is capable of being formed using a mold having only two plates relatively movable in the Z axis direction.

4. The attaching structure assembly of claim 2, wherein the attached component, including the clip holding component is capable of being formed using a mold having only two plates relatively movable in the X axis direction.

5. The attaching structure assembly of claim 2, wherein the attached component, including the clip holding component, is capable of being formed using a mold having only two plates relatively movable in an angular direction between the X axis direction and the Z axis direction.

6. The attaching structure assembly of claim 1, wherein the clip holding component further comprises a stopper positioned to limit motion in an insertion direction by engaging the seat portion of the clip.

7. The attaching structure assembly of claim 2, wherein the clip holding component further comprises outer side ribs positioned to engage the flanges and limit movement of the clip in the X axis direction and in a Y axis direction, which is orthogonal to the X axis direction and to the Z axis direction.

8. The attaching structure assembly as set forth in claim 2, further comprising a second clip coupled to a second clip holding component, and wherein the panel engaging component of the second clip is structured to move in the X axis direction as the panel engaging component is inserted into the aperture of the panel component, and wherein the mating component of the second clip and the second clip holding component of the attached component are structured for relative movement in the Z axis direction or the Y axis direction, as the clip is inserted into the clip holding component.

9. The attaching structure assembly as set forth in claim 1, comprising a plurality of the clip holding components and a plurality of the clips wherein at least one of the clip holding components is structured to prevent lateral movement of a respective one of the clips inserted therein, and wherein at least two of the clip holding components are structured to permit lateral movement of respective clips inserted therein to accommodate for dimensional variations.

10. The attaching structure assembly as set forth in claim 9, wherein the at least one clip holding components includes a dimension of the slit relative to a width of the columnar portion that prevents lateral movement of the respective one of the clips inserted therein.

11. The attaching structure assembly as set forth in claim 9, wherein the at least one clip holding components includes a position of the connecting portion ribs relative to a respective position of the flanges that prevents lateral movement of the respective one of the clips inserted therein.

12. The attaching structure assembly as set forth in the claim 9, wherein the at least two clip holding components include a dimension of the slit relative to a width of the columnar portion that permit lateral movement of the respective one of the clips inserted therein.

13. The attaching structure assembly of claim 1, wherein the attached component, including the clip holding component, is capable of being formed using a mold without a slide.

* * * * *

UNITED STATES PATENT AND TRADEMARK OFFICE
CERTIFICATE OF CORRECTION

PATENT NO. : 9,956,925 B2
APPLICATION NO. : 15/175470
DATED : May 1, 2018
INVENTOR(S) : Kei Akazawa et al.

It is certified that error appears in the above-identified patent and that said Letters Patent is hereby corrected as shown below:

In the Claims

Column 10,    Line 25    In Claim 12, after "in", delete "the"

Signed and Sealed this
Eleventh Day of September, 2018

Andrei Iancu
*Director of the United States Patent and Trademark Office*